US010175366B1

(12) United States Patent
Furumiya

(10) Patent No.: US 10,175,366 B1
(45) Date of Patent: Jan. 8, 2019

(54) RADIATION DETECTOR AND RADIATION IMAGING DEVICE COMPRISING SAME

(71) Applicant: SHIMADZU CORPORATION, Kyoto (JP)

(72) Inventor: Tetsuo Furumiya, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 15/736,917

(22) PCT Filed: May 16, 2016

(86) PCT No.: PCT/JP2016/064484
§ 371 (c)(1),
(2) Date: Dec. 15, 2017

(87) PCT Pub. No.: WO2016/208295
PCT Pub. Date: Dec. 29, 2016

(30) Foreign Application Priority Data

Jun. 24, 2015 (JP) .................................. 2015-126801

(51) Int. Cl.
*G01T 1/20* (2006.01)
*G01T 1/208* (2006.01)
*G01T 1/202* (2006.01)

(52) U.S. Cl.
CPC .............. *G01T 1/208* (2013.01); *G01T 1/202* (2013.01); *G01T 1/2006* (2013.01)

(58) Field of Classification Search
CPC ........ G01T 1/208; G01T 1/2006; G01T 1/202
USPC ........................................................ 250/366
See application file for complete search history.

(56) References Cited

U.S. PATENT DOCUMENTS

2007/0023669 A1* 2/2007 Hefetz .................. A61B 6/032
250/370.14

FOREIGN PATENT DOCUMENTS

| JP | H04-274794 | 9/1992 |
| JP | H09-005445 | 1/1997 |
| JP | 20090229257 | 10/2009 |
| JP | 2011-137821 | 7/2011 |

(Continued)

OTHER PUBLICATIONS

PCT/JP2016/064484 International Search Report and Written Opinion dated Jul. 19, 2016, 2 pages—English, 6 pages—Japanese.

*Primary Examiner* — David Porta
*Assistant Examiner* — Meenakshi Sahu
(74) *Attorney, Agent, or Firm* — Andrew F. Young, Esq.; Lackenbach Siegel, LLP

(57) ABSTRACT

A radiation detector that improves accurately a fluorescence emission-time. A limiter circuit instead of a low-pass filter and a high-pass filter removes a noise component of the amplifier output. The limiter circuit blocks passing through the amplification signal when the amplification signal output from the amplifier a is lower than the limit level. Accordingly, a noise component output not related to the fluorescence detection from the amplifier a is blocked by the limiter circuit L and is unable to reach to the addition circuit. When the amplification signal output from the amplifier a is larger than the limit level, the limiter circuit L passes through such amplification signal; so that the signal, which is related to a fluorescence detection, that the amplifier a outputs can be absolutely input into the fluorescence emission-time calculation element.

5 Claims, 22 Drawing Sheets

(56) References Cited

FOREIGN PATENT DOCUMENTS

JP 2012-253024 12/2012

* cited by examiner

Detect by a plurality of detection elements

Limit value

Limiter processing

Limit value

Output of limiter circuit La1

Output of limiter circuit La2

Output of limiter circuit La3

Output of limiter circuit La4

Output of limiter circuit La5

⋮

Output of limiter circuit La64

Addition processing

FIG. 13A
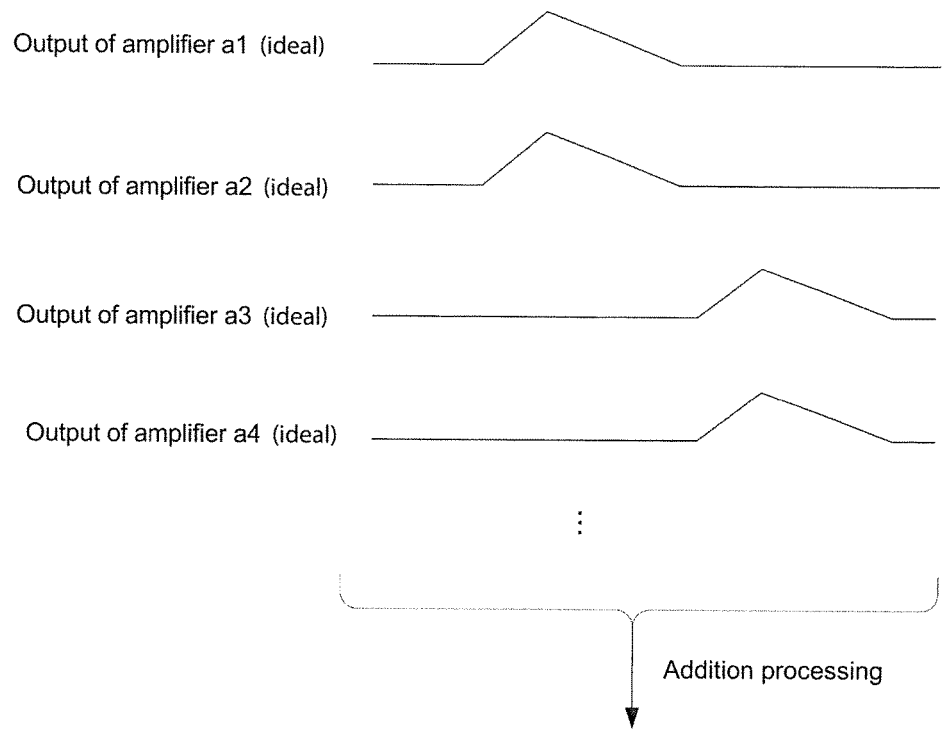
Output of amplifier a1 (ideal)
Output of amplifier a2 (ideal)
Output of amplifier a3 (ideal)
Output of amplifier a4 (ideal)
Addition processing
FIG. 13B

FIG. 14 REPLACEMENT SHEET
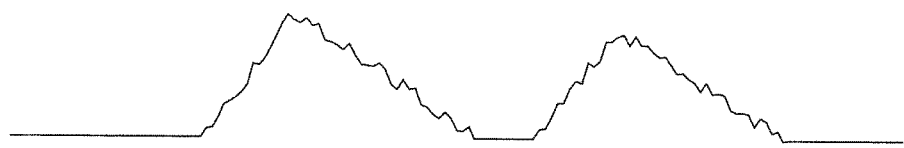

Detection Element

FIG. 17  PRIOR ART  REPLACEMENT SHEET

Ideal output signal of addition circuit

RADIATION DETECTOR AND RADIATION IMAGING DEVICE COMPRISING SAME

CROSS REFERENCE TO RELATED APPLICATIONS

This application relates to, and claims priority from International PCT Ser. No. PCT/JP2016/064484 filed May 16, 2016, the entire contents of which are incorporated herein by reference, which in turn claims priority from JP Ser. No. JP2015-126801 filed Jun. 24, 2015.

FIGURE SELECTED FOR PUBLICATION

FIG. 5.

BACKGROUND OF THE INVENTION

Field of the Invention

The present invention relates to a radiation detector having a scintillator that converts a radiation to a fluorescence and a radiation imaging device having such radiation detector.

Background

A radiation detector having the structure shown in FIG. 15 is known as the radiation detector that detects a radiation. Such radiation detector comprises a scintillator 52 that converts the radiation to a fluorescence and a photodetector 53 that detects the fluorescence. The scintillator 52 comprises arrayed tetragonal-pillar scintillator (scintillation) crystals and the photodetector comprises a plurality of arrayed detection elements (e.g., see the Patent Document 1).

Some of such radiation detectors adopt the structure in which a pitch of the array of the scintillator crystals in the scintillator 52 and a pitch of the array of the detection elements in the photodetector 53 are not the same pitch each other. Such radiation detector comprises a scintillator crystal bridging the adjacent detection elements one another. Referring to FIG. 16, fluorescences emitted from such scintillator crystal are incident into more than two detection elements. The star sign in FIG. 16 indicates the originating point of the fluorescence. Specifically, it is given that the radiation detector in FIG. 15 detects a single fluorescence emitted from the scintillator crystal is detected by a plurality of detection elements.

In fact, the structure shown in FIG. 15 is an example of the radiation detector that detects the single fluorescence by a plurality of detection elements. Even when the pitch of array of the scintillator crystals and the pitch of array of detection elements are the same, the fluorescence emitted from the scintillator crystal may be detected by a plurality of detection elements. The reason is that the fluorescence emitted from the scintillator crystal broadens while passing through the next scintillator crystal.

Actually, the radiation detector enables to calculate the time when the scintillator crystal emits a fluorescence (fluorescence emission-time). Given all fluorescences emitted from the scintillator crystals are incident into the single detection element, the emission-time can be easily calculated. The reason is that only output of the detection element in conjunction with the incident fluorescence is just monitored so that the emission-time can be calculated. However, as set forth referring to FIG. 15, when the radiation detector that detects a single fluorescence by a plurality of detection elements is applied, such method cannot be applied as-is.

Accordingly, the structure referring to FIG. 17 is conventional proposed. According to such structure, a detection result of the plurality of detection elements is input into the OR circuit after passing a discriminator. When a fluorescence is emitted from the scintillator 2, first of all, any one of the plurality of detection elements detects the fluorescence. Referring to FIG. 17, the fluorescence emission-time is obtained based on the detection element that detects, first of all, the fluorescence. According to such structure, it is supposed that the fluorescence emission-time can be obtained accurately. However, such method has following problems. Specifically, when the single fluorescence is detected by a plurality of detection elements, the output signal from each detection element is weak. The reason is that the fluorescence that is pluralized is detected by the detection element. The detection element just detects only a part of the fluorescences despite the detection element that detects first the fluorescence among a plurality of detection elements. Compared to the case in which all fluorescences are incident into the single detection element, the detection signal output from the detection element is weak. It is limited that the fluorescence emission-time is accurately obtained based on the weak signal.

Then, as set forth referring to FIG. 15, the method by which the radiation detector can provide more accurate fluorescence emission-time than the structure in FIG. 17 is proposed. Specifically, referring to FIG. 18, the output signal output from each detection element is individually amplified by an amplifier and afterward, the single signal is generated by an addition. The signal generated by such addition indicates how the entire photodetector 53 detected the fluorescences. In such way, when the output signals output from each detection element are summed; a strong signal can be obtained, and the fluorescence emission-time can be accurately calculated.

FIG. 19 is illustrating a circuit that achieves a calculation of the fluorescence emission-time as set forth above. Each output from each detection element 61 is input into the corresponding each amplifier 62. Each output of the amplifier 62 is input into the addition circuit 63. The output of the addition circuit 63 is input into a fluorescence emission-time calculation element 64.

FIG. 20, is illustrating an operation of the circuit when a fluorescence is emitted. Not all detection elements installed to the photodetector 53 detect the fluorescence. Referring to FIG. 20, only two shaded detection elements 61 detect the fluorescence. It is clear when look carefully that the signal output from the amplifier 62 connected to the detection element 61 that detects the fluorescence includes a noise component in addition to the signal component. In fact, such noise component is output from the amplifier connected to the other detection element 61 that does not detect the fluorescence. When the addition circuit sums such signals, the noise component other than the signal component is summed.

Consequently, the output signal of the addition circuit adds fairly lots of noise components. Referring to FIG. 21, an ideal output signal of the addition circuit 63 is illustrated. In general, the fluorescence becomes gradually strong and the decay thereof takes a long time. On the other hand, referring to FIG. 22, the actual signal output from the addition circuit 63 is illustrated. The addition circuit 63 generates the output signal by adding not only a noise component in association with the detection element that detects the fluorescence, but also adding a noise component in association with the detection element that does not detect the fluorescence, so that the output signal can be largely irregular.

It is extremely hard to calculate accurately the fluorescence emission-time based on such irregular signals. Accordingly, a method to control such irregularity of the output signal is conventionally proposed. Specifically, the output from each amplifier 62 is passed through a low-pass filter and input into the addition circuit 63. When passed through the low-pass filter, the noise component that appears in the signal as a high-frequency wave component is removed. In addition, a method, in which the noise component is removed by passing the output of each amplifier 62 through a high-pass filter, is disclosed.

RELATED PRIOR ART DOCUMENTS

Patent Document

Patent Document 1
JP H4-274794 A 1

ASPECTS AND SUMMARY OF THE INVENTION

Objects to be Solved

However, there are following problems remain in the conventional apparatus.

Specifically, the conventional radiation detector is not a sufficient structure to calculate accurately a fluorescence emission-time.

When the output signal from the amplifier 62 is passed through the low-pass filter or the high-pass filter, not only the noise component included in the output signal is removed, but also the signal-wave relative to the signal component is faired. Consequently, the signal output from the addition circuit 63 does not accurately represent the time variation of the inherent fluorescence strength. Specifically, when the output signal of the amplifier 62 or the addition circuit 63 is passed through the low-pass filter or the high-pass filter, the signal illustrated in FIG. 21 should be ideally input into the fluorescence emission-time calculation element 64, but the signal having an irregular wave-shape is actually input into the fluorescence emission-time calculation element 64. In such way, according to the conventional structure, it is hard to calculate accurately the fluorescence emission-time based on such irregular signals.

The inventor illustrates the reason why the signal wave-shape relative to the signal component is faired by the filter. The high-pass filter and the low-pass filter cut a specific frequency component included in the output signal of the amplifier 62. At the same time, the signal component included in the output signal includes a variety of frequency components. Accordingly, when the component relative to the specific frequency is cut to remove the noise component included in the output signal, the signal relative to such frequency in the signal component is removed. Specifically, a part of frequencies included in the output signal is extracted by the high-pass filter and the low-pass filter, so that such result (effect) appears on the wave-shape of the signal component. This is the reason why the signal wave-shape relative to the signal component is faired by the filter.

Considering such circumstances, the purpose of the present invention is to provide a radiation detector that can calculate further accurately a fluorescence emission-time.

Means for Solving the Problem

The present invention comprises the following structures to solve the above problem.

Specifically, a radiation detector of the present invention comprises: a scintillator having arrayed scintillator crystals that convert a radiation to a fluorescence; a photodetector that detects the fluorescence emitted from the scintillator crystals by a plurality of detection elements, in which detection elements that detect a fluorescence are arrayed; an amplifier that amplifies an element signal output from the detection element; a limiter circuit that holds a limit level that is set as higher than a amplification signal that varies depending on a noise output from the amplifier when the detection element detects no fluorescence, and that blocks the amplification signal by outputting a signal corresponding to the limit level when the amplification signal, which is output from the amplifier, is lower than the limit level, and passes the amplification signal when the amplification signal is larger than the limit level; a limiter circuit signal addition means that sums signals output from each limiter circuit corresponding to each detection element of the photodetector; and a fluorescence emission-time calculation means that calculates an emission-time of the fluorescence based on the output of the limiter circuit signal addition means.

Action and Effect

The present invention improves a signal processing relative to an output of an amplifier. Specifically, according to the present invention, the limiter circuit instead of a low-pass filter and a high-pass filter removes a noise component of the amplifier output. The limiter circuit blocks passing through the amplification signal when the amplification signal output from the amplifier is lower than the limit level. Accordingly, a noise component output not related to the fluorescence detection from the amplifier is blocked by the limiter circuit and is unable to reach to the addition circuit. On the other hand, when the amplification signal output from the amplifier is larger than the limit level, the limiter circuit passes through such amplification signal; so that the signal related to a fluorescence detection, which the amplifier outputs, can be absolutely input into the fluorescence emission-time calculation means. Consequently, according to the present invention, a radiation detector that can calculate further accurately the fluorescence emission-time can be provided.

In addition, according to the above described radiation detector, it is further preferable that a fluorescence emission-location calculation means that calculates an emission-location of the fluorescence based on the amplification signal output from each amplifier corresponding to each detection element is equipped to the photodetector.

Action and Effect

The above aspect illustrates further specifically the present invention. The fluorescence emission-location calculation means of the present invention can be operative based on the amplification signal output from the amplifier bypassing the limiter circuit.

Further, according to the above radiation detector, it is further preferable that an amplifier signal addition means that sums the amplification signals output from each amplifier corresponding to each detection element of the photodetector; and a fluorescence strength calculation means that calculates a fluorescence strength based on an output of the amplifier signal addition means.

Action and Effect

The above aspect illustrates further specifically the present invention. The fluorescence strength calculation means of the present invention can be operative based on the amplification signal output from the amplifier bypassing the limiter circuit.

In addition, it is preferable that the array pitch of the scintillator crystals and the array pitch of the detection elements are different each other in the above radiation detector.

Action and Effect

The above aspect illustrates further specifically the present invention. When the array pitch of the scintillator crystals and the array pitch of the detection elements are different each other, a plurality of the detection elements is optically connected to one scintillator crystal. In such structure, it is given that the fluorescence emitted from the scintillator crystal is detected by a plurality of the detection elements, so that the application of the present invention is quite significant.

In addition, the radiation detector set forth above can be equipped to a radiation imaging device.

Action and Effect

The radiation detector of the present invention enables to calculate accurately the incident time of the radiation, so that such radiation detector is appropriately applied to such as TOF-PET (Time of Flight-Positron Emission Tomography) and so forth.

Effect of the Invention

According to the structure of the present invention, the limiter circuit instead of a low-pass filter and a high-pass filter removes a noise component of the amplifier output. The limiter circuit blocks passing through the amplification signal when the amplification signal output from the amplifier is lower than the limit level. Accordingly, a noise component output not related to the fluorescence detection from the amplifier is blocked by the limiter circuit and is unable to reach to the addition circuit. On the other hand, when the amplification signal output from the amplifier is larger than the limit level, the limiter circuit passes through such amplification signal; so that the signal related to a fluorescence detection, which the amplifier outputs, can be absolutely input into the fluorescence emission-time calculation means. Consequently, according to the present invention, a radiation detector that can calculate further accurately the fluorescence emission-time can be provided.

BRIEF DESCRIPTION OF THE DRAWINGS

FIG. 13A, 13B are schematic diagrams illustrating the other effect of the limiter circuit according to the aspect of Embodiment 1.

FIG. 14 is a schematic diagram illustrating the other effect of the limiter circuit according to the aspect of Embodiment 1.

DETAILED DESCRIPTION OF THE PREFERRED EMBODIMENTS

Figure 1:
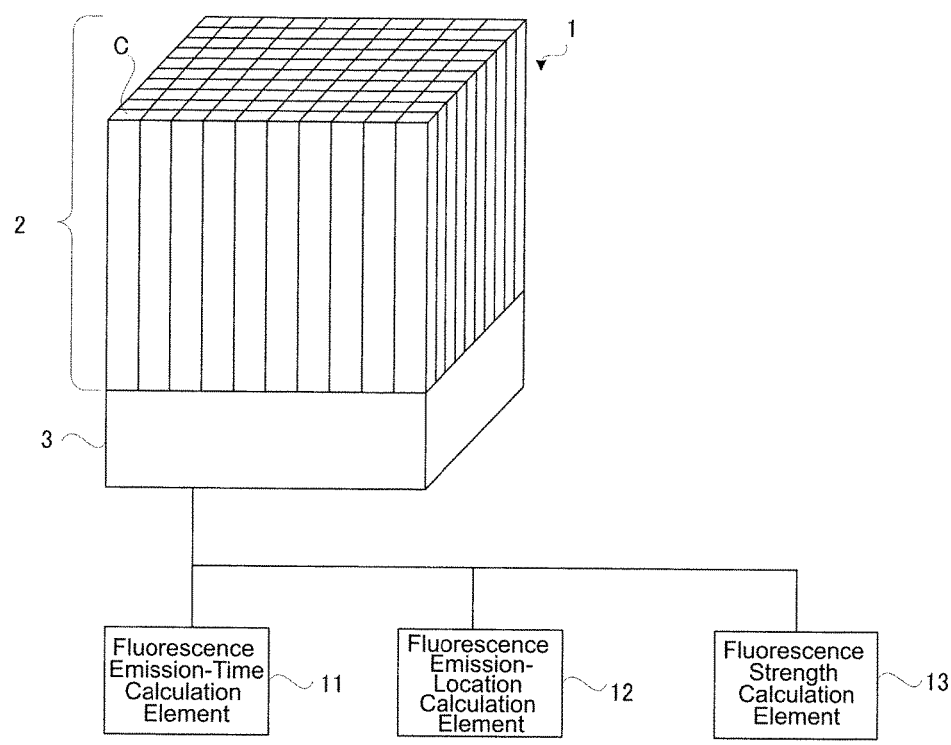
FIG. 1 is a functional block diagram illustrating the total system of the radiation detector of Embodiment 1.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements, modules or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

It will be further understood by those of skill in the art that the apparatus and devices and the elements herein, without limitation, and including the sub components such as operational structures, circuits, communication pathways, and related elements, control elements of all kinds, display circuits and display systems and elements, any necessary driving elements, inputs, sensors, detectors, memory elements, processors and any combinations of these structures etc. as will be understood by those of skill in the art as also being identified as or capable of operating the systems and devices and subcomponents noted herein and structures that accomplish the functions without restrictive language or label requirements since those of skill in the art are well versed in related devices, computer and operational controls and technologies of radiographic devices and all their sub components, elements, modules, and programs, including various circuits, elements, and modules, and combinations thereof without departing from the scope and spirit of the present invention.

Although only a few embodiments have been disclosed in detail above, other embodiments are possible and the inventors intend these to be encompassed within this specification. The specification describes certain technological solutions to solve the technical problems that are described expressly and inherently in this application. This disclosure describes embodiments, and the claims are intended to cover any modification or alternative or generalization of these embodiments which might be predictable to a person having ordinary skill in the art.

Hereafter, the inventor sets forth the best mode of the Embodiment of the present invention. According to Embodiment, γ-ray corresponds to a radiation of the present invention. Each means set forth in the Embodiment can be brought into reality by a circuit corresponding to each means.

Embodiment 1

(Entire Structure of the Radiation Detector)

Referring to FIG. 1, a radiation detector 1 comprises: a scintillator 2 in which scintillator crystals C are arrayed and unified in a matrix in a plane; and a photodetector 3 that is installed underside the scintillator 2 and detects fluorescence emitted from the scintillator 2. Referring to FIG. 1, the scintillator 2 comprises the long scintillator crystals C in the height direction, which are arrayed in the two-dimensional matrix having 10 in the length direction and 10 in the width direction, i.e., total 100 scintillator crystals C.

The scintillator crystals C comprises LGSO (Lu, Gd)$_2$SiO$_5$ containing cerium element, so that the scintillator crystals C characteristically emit fluorescence when a γ-ray is incident. Instead of LGSO, the scintillator crystals C may comprise the other material such as GSO (Gd$_2$SiO$_5$) and so forth. The scintillator crystals C converts the γ-ray to a fluorescence.

The scintillator crystals C adjacent each other are optically connected. The scintillator crystals C that are unified by connecting each of the scintillator crystals C per se form a scintillator 2.

Figure 2A:
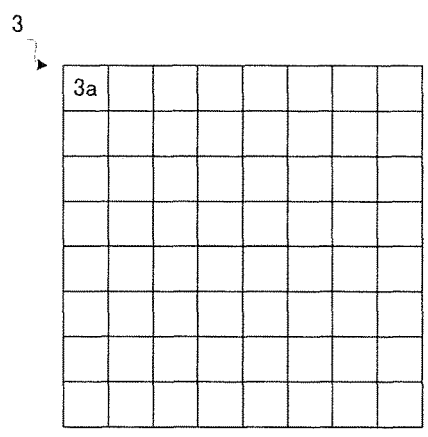
FIG. 2A, 2B are schematic diagrams illustrating a photodetector according to the aspect of the Embodiment 1.

The photodetector 3 comprises a plurality of detection elements 3a referring to FIG. 2A. The detection element 3a is a photo-sensor that detects a fluorescence emitted from the scintillator 2. The photodetector 3 comprises the detection elements 3a that are arrayed in the two-dimensional matrix having 8 in the length direction and 8 in the width direction, i.e., total 64 detection elements 3a. The photodetector 3, in which the detection elements 3a that detect a fluorescence are arrayed, detects the fluorescence emitted from the scintillator crystals C by a plurality of the detection elements 3a.

Figure 2B:
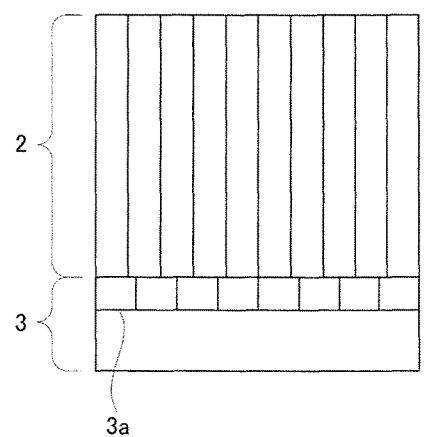

Referring to FIG. 2B, the aspect, in which the scintillator 2 and the photodetector 3 are optically connected, is illustrated. Referring to FIG. 2B, the array pitch of the crystals of the scintillator 2 and the array pitch of the detection elements of the photodetector 3 are different each other. Accordingly, the scintillator 2 includes a lot of scintillator crystals to which a plurality of detection elements is optically connected. Given the fluorescence is emitted from such scintillator crystals C, the fluorescence is detected by each of a plurality of detection elements 3a optically connected to such crystals.

Referring to FIG. 1, the fluorescence emission-time calculation element 11 calculates the time when the fluorescence emitted from the scintillator 2 emits at the scintillator 2, based on the fluorescence detection signal output from each detection element 3a of the photodetector 3. The fluorescence emission-location calculation element 12 calculates to identify any scintillator crystal C, at which the fluorescence is emitted from the scintillator 2, based on the fluorescence detection signal output from each detection element 3a of the photodetector 3. The fluorescence strength calculation element 13 calculates a strength of the fluorescence emitted from the scintillator 2 based on the fluorescence detection signal output from each detection element 3a of the photodetector 3. The fluorescence emission-time calculation element 11 corresponds to the fluorescence emission-time calculation means of the present invention and the fluorescence emission-location calculation element 12 corresponds to the fluorescence emission-location calculation means of the present invention. In addition, the fluorescence strength calculation element 13 corresponds to the fluorescence strength calculation means of the present invention.

(Detection of a Fluorescence by a Plurality of the Detection Elements 3a)

Figure 3A:
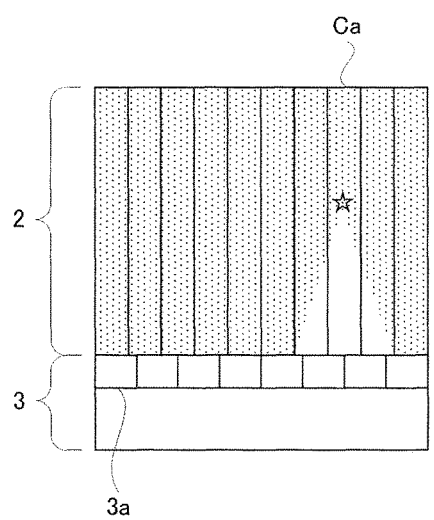
FIG. 3A, 3B are schematic diagrams illustrating an aspect of broadening of the fluorescence emitted from the scintillator according to the Embodiment 1.
Figure 3B:
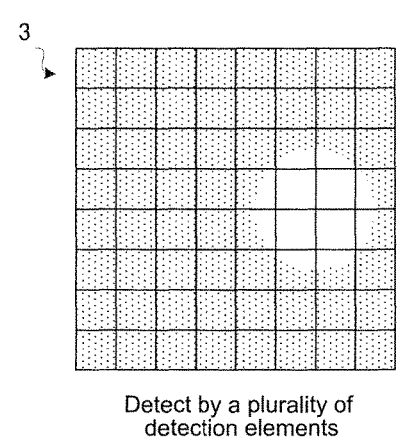

Referring to FIGS. 3A, 3B, the aspect in which the fluorescence is detected by a plurality of detection elements 3a. Referring to FIG. 3A, the scintillator crystal indicated by the sign Ca is optically connected to the two detection elements 3a. Given the fluorescence emits at the location indicated by the star sign in the scintillator crystal Ca, the florescence is incident into both two detection elements 3a connected to the crystal. In addition, referring to FIG. 3A, the fluorescence travels toward the photodetector 3 while gradually broadening, so that even a slight amount of the fluorescence may be incident into the adjacent detection element 3a to the two detection elements 3a connected to the crystal.

Referring to FIG. 3B, it is illustrated how the fluorescence is incident into the two-dimensional matrix of the detection elements. Considering that the fluorescence is incident while broadening not only in the lateral direction, but also in the longitudinal direction; it is understandable that the number of the detection elements 3a that detect the fluorescence is significantly large.

Figure 4:
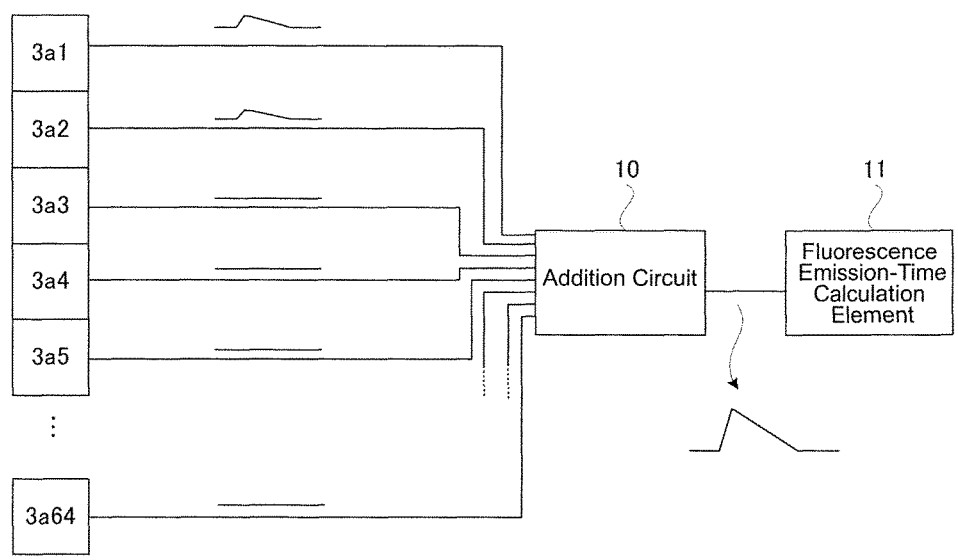
FIG. 4 is a schematic diagram illustrating an addition circuit according to the aspect of Embodiment 1.

Referring to FIG. 4, it is illustrated how the fluorescence emission-time is identified based on the output signal output from each detection element 3a. Referring to FIG. 4, for the sake of simplifying the explanation, the detection elements 3a1, 3a2 detect the fluorescence, but other detection elements 3a3, 3a4, 3a5, . . . , 3a64 do not detect the fluorescence. All outputs from the detection elements 3a are input into the addition circuit 10 to be summed. Consequently, the detection signal that is output when the photodetector 3 is deemed as if one detection element can be obtained. The fluorescence is dispersed and detected by a plurality of detection elements 3a1, 3a2, so that the signal per se output from the detection elements 3a1, 3a2 is weak. When the fluorescence is detected by one detection element 3a while summing the entire output signals from the detection elements 3a, the strong signal that is likely output can be obtained. The signal that is used as a basis of the calculation must be strong to some extent so that the fluorescence emission-time calculation element 11 can accurately calculate the time when the fluorescence emits. The addition circuit 10 corresponds to the limiter circuit signal addition means of the present invention.

Figure 5:
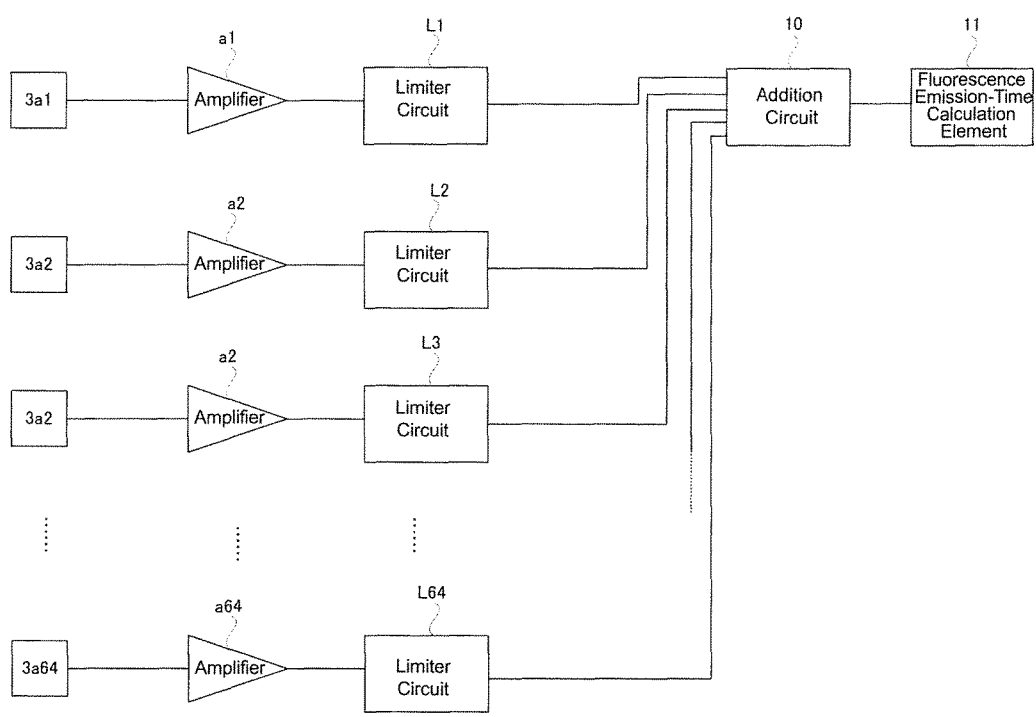
FIG. 5 is a schematic diagram illustrating a limiter circuit according to the aspect of Embodiment 1.

Referring to FIG. 5, the structure of the input side of the addition circuit 10, which is not shown in FIG. 4, is illustrated in detail. The output of the detection element 3a1 is not directly input into the addition circuit 10. The element signal output from the detection element 3a1 is input into the amplifier a1. The amplifier a1 amplifies the element signal in a predetermined magnitude and outputs the amplification signal. The output of the amplifier a1 is an input of the limiter circuit L1. Now, the output of the limiter circuit L1 is an input of the addition circuit 10.

The amplifier and the limiter circuit that correspond to the detection elements other than the detection element 3a1 are installed. Specifically, the structure, in which the detection element 3a1, the amplifier a1 and the limiter circuit L1 are connected in series, is also applied to the other detection element. The amplifier and the limiter circuit connected to the detection element 3a2 are called the amplifier a2 and the limiter circuit L2 to be discriminated from the above amplifier L1 and the limiter circuit L1. The other amplifier and the other limiter circuit are the same as the above specification. The addition circuit 10 sums signals output from each of the limiter circuits L corresponding to each of the detection elements of the photodetector 3.

(Operation of the Limiter Circuit)

The most characteristic aspect of the present invention is the point in which the limiter circuit L is installed between the amplifier a and the addition circuit 10. The limiter circuit holds a set-up value that indicates a predetermined voltage called a limit value. The limiter circuit L outputs the voltage (limit level voltage) indicated by the limit value when the input signal is lower than the limit value and the same as the limit value. And, the limiter circuit L outputs the input signal as-is when the input signal is larger than the limit value. The limiter circuit L blocks the amplification signal by outputting the signal corresponding to the limit level when the amplification signal output from the amplifier a is lower than the limit level, and passes the amplification signal when the amplification signal output is larger than the limit level.

Figure 6A:
FIG. 6A, 6B are schematic diagrams illustrating an operation of the limiter circuit according to the aspect of Embodiment 1.
Figure 6B:

Referring to FIGS. 6A, 6B, an operation of the limiter circuit L is illustrated. A signal illustrated in FIG. 6A is given. A voltage thereof is normally at the base level. Then, the voltage begins to rise at some point and gradually the voltage lowers. Then, the voltage returns to the base level at last. The limit level voltage of the limiter circuit L is set up so that such voltage is higher than the base voltage. Accordingly, when the input signal is around the base level. the input signal is lower than the limit level, so that the output of the limiter circuit L is the limit level. And, when the input signal is away from the base level and becomes larger than the limit value, the output of the limiter circuit L is an input signal.

Figures 7A, 7B:
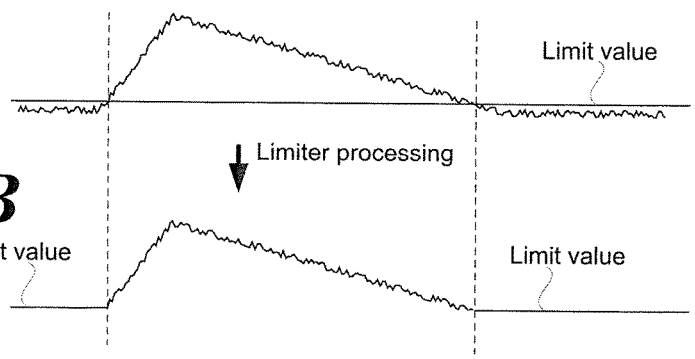
FIG. 7A, 7B are schematic diagrams illustrating an operation of the limiter circuit according to the aspect of Embodiment 1.

In general, a signal contains a noise component. Referring to FIGS. 7A, 7B, what kind of signal is output is illustrated when the detection signal of the fluorescence, to which the noise component is superimposed, is input into the limiter circuit L. When the input signal is at the base level, the output of the limiter circuit L is the limit value. As this time, the noise component that is superimposed at the base level is removed. And, when the input signal is away from the base level and becomes larger than the limit value, the output of the limiter circuit L is an input signal.

An ingenuity relative to the limit value of the limiter circuit L is needed to accomplish such operation. The input signal of the limiter circuit L is always fluctuated due to the noise component. When the input signal is over the limit value due to the fluctuation of the noise component, a part of the noise component passes and is output from the limiter circuit L. Accordingly, the limit value muse be set up so that the input signal is never over the limit value due to the fluctuation of the noise component under the condition in which the fluorescence is not detected. Now, the limit value held by the limit circuit L is set up to be higher than the amplification signal that varies due to the noise output from the amplifier a when the detection element 3a is not detecting the fluorescence.

Regardless, it is problematic that the limit value is too high. The limiter circuit L is operative to compensate the part, in which the signal varies around the base level, by increasing the limit level. Therefore, when the limit value is too high, the higher the increase level of the signal to compensate becomes and the lower the peak included in the signal becomes, accordingly. It is disadvantageous that the limit value increases too much when the accurate signal is obtained. Now, the limit value held by the limiter circuit L is set up to be lower than the amplification signal output from the amplifier a when the detection element 3a is detecting the fluorescence.

Figure 8A:
FIG. 8A, 8B are schematic diagrams illustrating an operation of the limiter circuit according to the aspect of Embodiment 1.
Figure 8B:
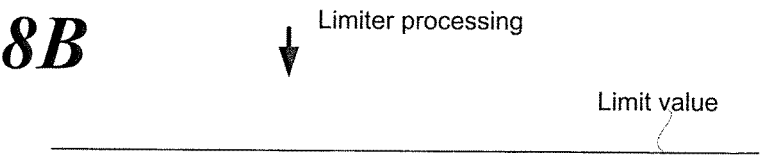

Referring to FIGS. 8A, 8B, it is illustrated what takes place when the output from the detection element 3a that is not involved in a fluorescence detection is input into the limiter circuit L. The output of the detection element 3a that is not involved in the fluorescence detection is around the base level and always lower than the limit level of the limiter circuit L. Accordingly, the limit level voltage corresponding to the limit value is output from the limiter circuit L.

(Effect of the Limiter Circuit L)

Figure 9A:
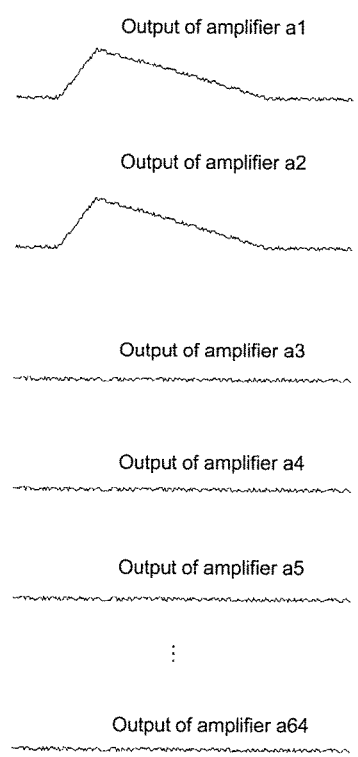
FIG. 9A, 9B are schematic diagrams illustrating an effect of the limiter circuit according to the aspect of Embodiment 1.
Figure 9B:
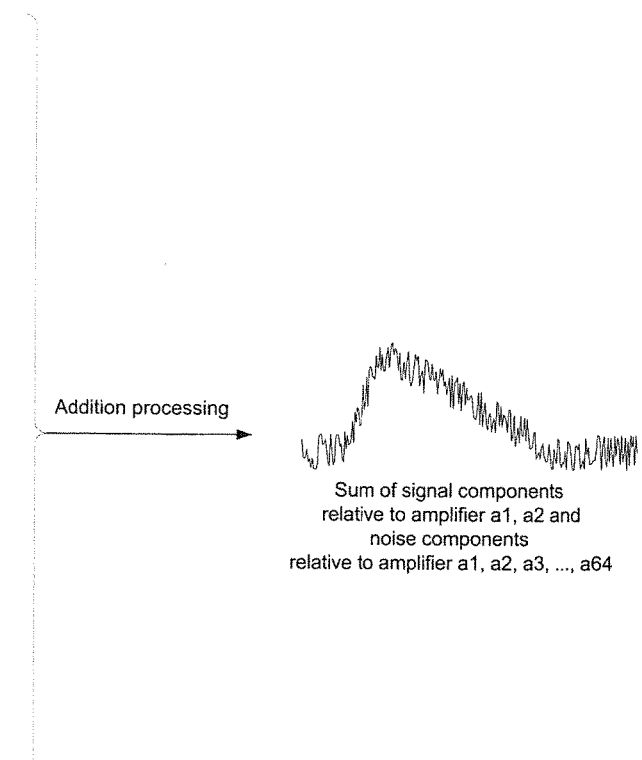

Next, the inventor sets forth an effect due to the installation of the limiter circuit L. Referring to FIGS. 9A, 9B, the case when the outputs of the amplifiers a1, a2, a3, a4, a5, . . . , a64 are input into the addition circuit 10 as-is bypassing the limiter circuit L is illustrated. Only the amplifiers a1, a2 are involved in the fluorescence detection. Regardless, the addition circuit 10 sums the entire outputs from all amplifiers a1, a2, a3, a4, a5, . . . , a64 without determining whether involved in the fluorescence detection or not. The signal obtained by such way is a sum of the signal component relative to the amplifier a1, a2 and the noise components relative to all amplifiers a1, a2, a3, a4, a5, . . . , a64. Consequently, the output signal from the addition circuit 10 includes extremely a lot of noise components.

Figure 10A:
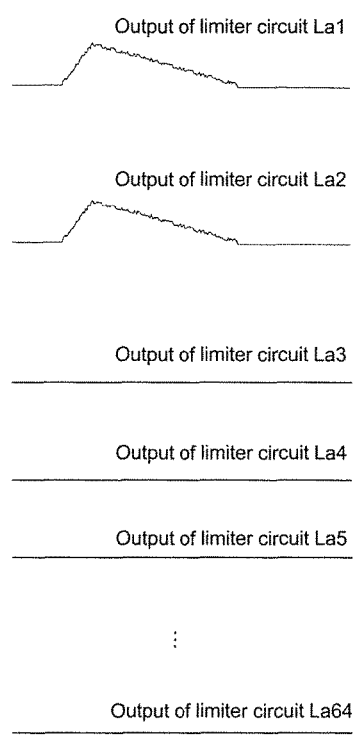
FIG. 10A, 10B are schematic diagrams illustrating an effect of the limiter circuit according to the aspect of Embodiment 1.
Figure 10B:
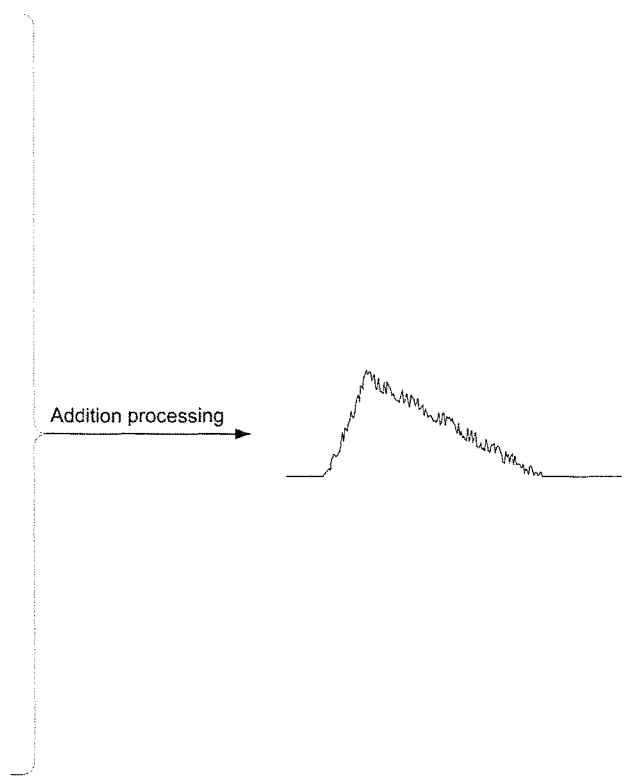

Referring to FIGS. 10A, 10B, the case when the outputs of the limiter circuits La1, La2, La3, La4, La5, . . . , La64 are input into the addition circuit 10. Regardless, the addition circuit 10 sums the entire outputs from all limiter circuits La1, La2, La3, La4, La5, . . . , La64 without determining whether participating the fluorescence detection or not. At this time, the summing of the noise components is limited. Specifically, all noise components that are included in the outputs from the limiter circuits La1, La2, La3, La4, La5, . . . , La64 before executing a limit processing are removed. At last, only the noise components relative to the limiter circuits La1, la2 can appear in the output signal of the addition circuit 10. The output signal of the addition circuit 10 does not include much noise components.

The inventor sets forth the further quantitative aspect with regard to the noise reduction using the limiter circuit L.

If the level of noise included in the output signal of the addition circuit 10 in the conventional system is Nc, Nc is calculated as follow.

$$Nc = ((M^{1/2} \times A(Ns^2 + Na^2)^{1/2})^2 + M^2 \times Nk^2)^{1/2}$$

Wherein M is the number of the detection elements 3a (64 according to the present Embodiment), A is a gain of the amplifier a, Ns is a noise originating in the detection element, Na is a noise originating in the amplifier and the Nk is a noise originating in the addition circuit 10.

On the other hand, if the level of noise included in the output signal of the addition circuit 10 in the Embodiment 1 is Ni, Ni is calculated as follow.

$$Ni = (M \times Nl^2 + M^2 \times Nk^2)^{1/2}$$

Wherein N is a noise originating in the limiter circuit L. In addition, the above formula is given in the case of setting the limit value higher than the noise level output from the amplifier a.

If the gain is 1, the noise Nk originating in the addition circuit 10 and the noise Nl originating in the limiter circuit L are deemed as almost the same as the noise Na of the amplifier; so that Nc and Ni can be rewritten as follow.

$$Nc = ((M^{1/2} \times A(Ns^2 + Na^2)^{1/2})^2 + M^2 \times Nk^2)^{1/2}$$

$$Ni = (M \times Nl^2 + M^2 \times Nk^2)^{1/2}$$

Accordingly, Nc is represented by the following formula.

$$Nc = (M \times A^2(Ns^2 + Na^2) + M^2 \times Na^2)^{1/2}$$
$$= (M \times A^2 Ns^2 + M \times Na^2 \times (A^2 + M))^{1/2}$$

Given the noise Na originating in the detection element is sufficiently small, Nc can be approximated as follow.

$$Nc \approx (M \times Na^2 \times (A^2 + M))^{1/2} \quad (1)$$

On the other hand, Ni is represented as follow.

$$Ni = (M \times Nl^2 + M2 \times Nk^2)^{1/2} \quad (2)$$
$$= (M \times Na^2 \times (1 + M))^{1/2}$$

Compared the formula (a) with the formula (2), $A^2$ of the formula (1) is replaced with 1 of the formula (2). Accordingly, it is understandable that the noise component included in the addition circuit 10 relative to the formula (2) is equal to the noise component included in the output from the addition circuit 10 when the gain of the amplifier relative to the formula (1) is 1 (i.e., not amplified). The amplifier adds an amplification to the signal so that the fluorescence emission-time calculation element 11, the fluorescence emission-location calculation element 12 and the fluorescence strength calculation element 13 are normally operative and the gain thereof is smaller than 1. Consequently, Nc>Ni can exist. Nc is the noise component relative to the conventional system and the Ni is the noise component relative to the present invention, so that it is understandable that the addition circuit 10 according to the aspect of the Embodiment outputs less noise component than the addition circuit 10 according to the conventional system.

(Operation of the Fluorescence Emission-Time Calculation Element 11)

An output signal of the addition circuit 10 is output to a fluorescence emission-time calculation element 11. The fluorescence emission-time calculation element 11 holds a threshold value denoting a predetermined voltage. The fluorescence emission-time calculation element 11 searches the point at which the voltage of the signal, which is lower than the threshold value, becomes the same as the threshold value. The fluorescence emission-time calculation element 11 recognizes the above point as the fluorescence emission-time. The fluorescence emission-time calculation element 11 calculates the fluorescence emission-time based on the output from the addition circuit 10.

Figure 12:
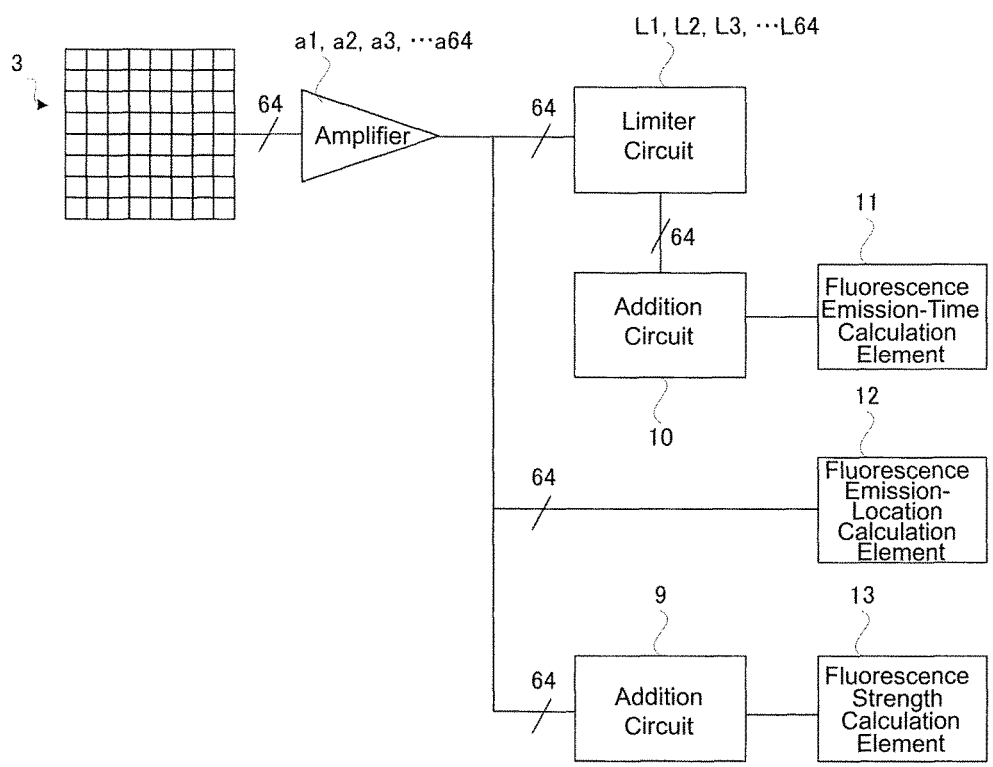
FIG. 12 is a schematic diagram illustrating the fluorescence emission-location calculation element and a fluorescence strength calculation element according to the aspect of the Embodiment 1.
Figure 15:
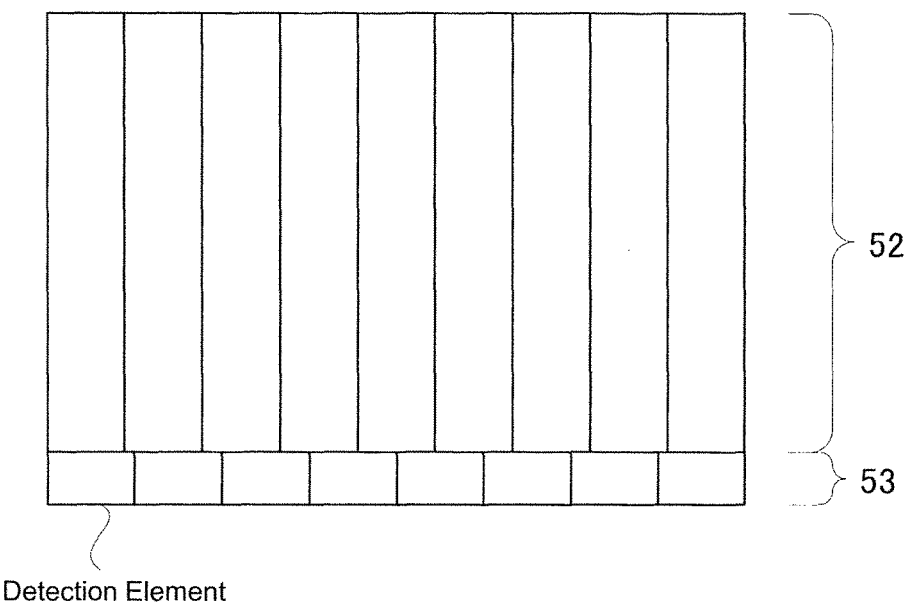
FIG. 15 is a schematic diagram illustrating the conventional radiation detector.
Figure 16:
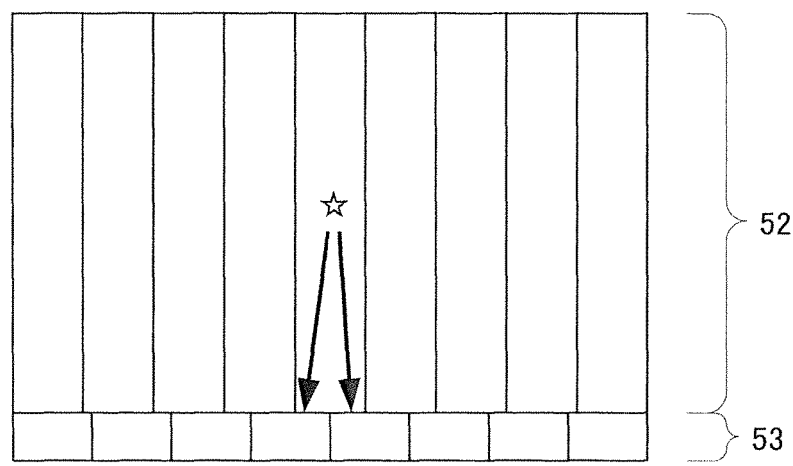
FIG. 16 is a schematic diagram illustrating the conventional radiation detector.
Figure 17:
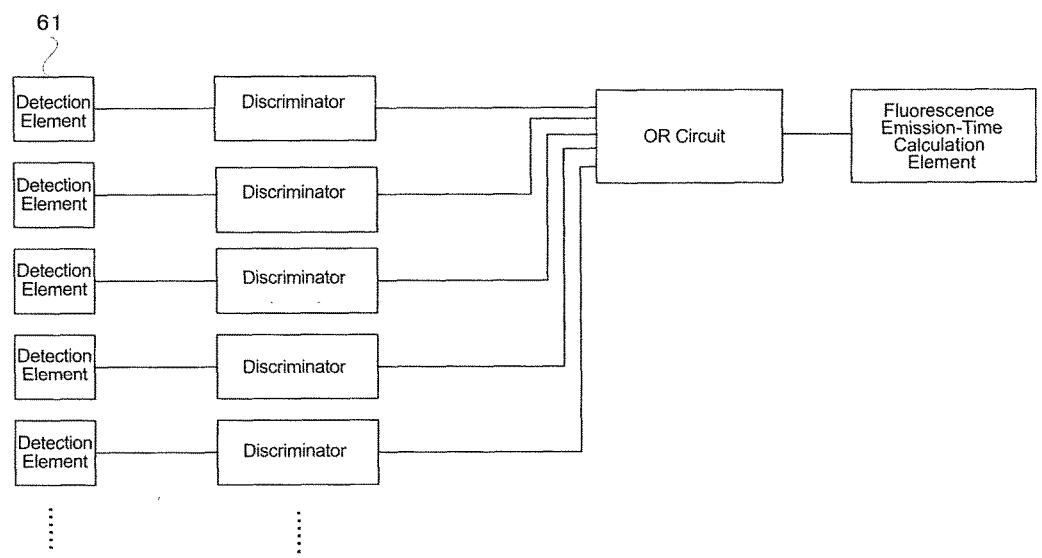
FIG. 17 is a schematic diagram illustrating the conventional radiation detector.
Figure 18:
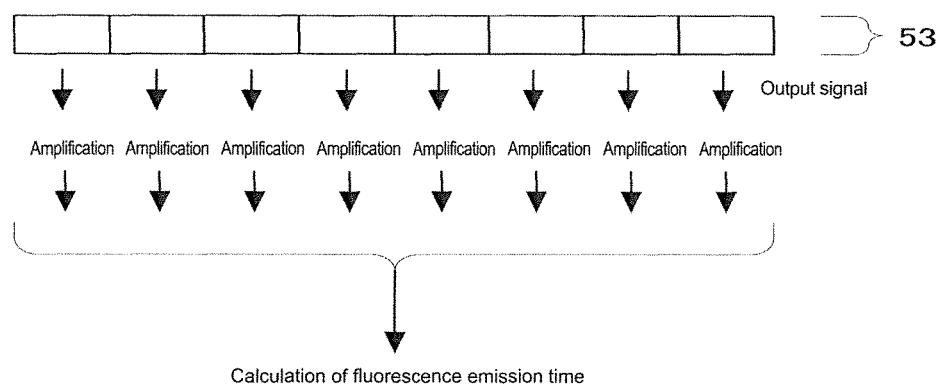
FIG. 18 is a schematic diagram illustrating the conventional radiation detector.
Figure 19:
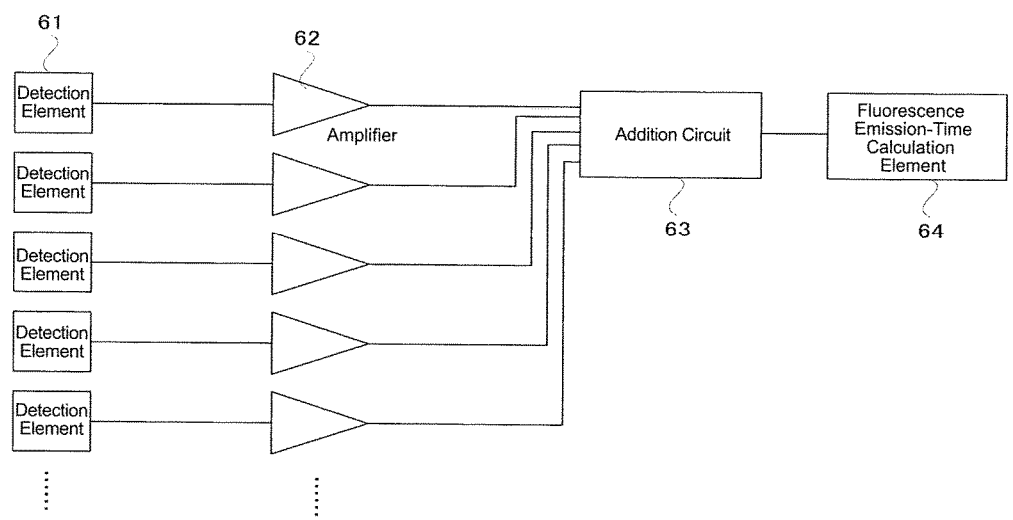
FIG. 19 is a schematic diagram illustrating the conventional radiation detector.
Figure 20:
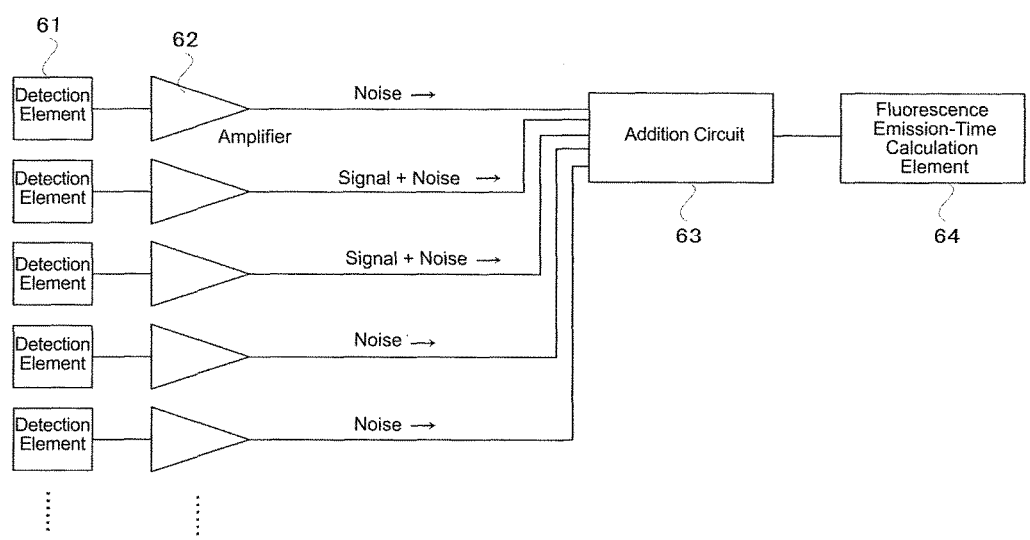
FIG. 20 is a schematic diagram illustrating the conventional radiation detector.
Figure 21:
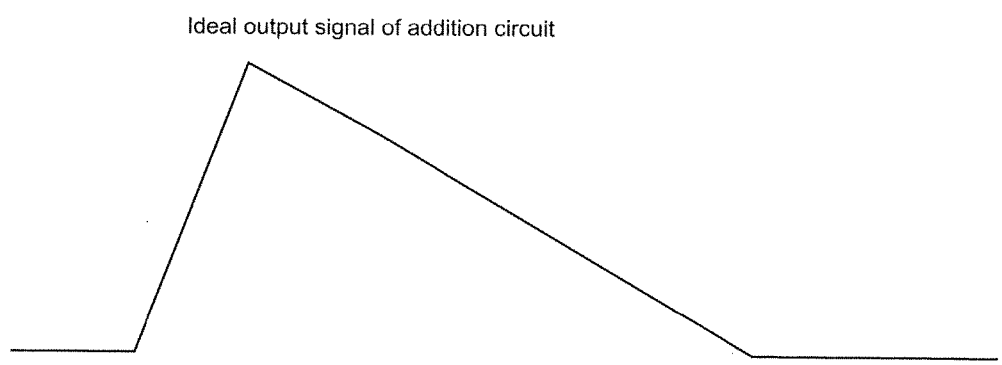
FIG. 21 is a schematic diagram illustrating the conventional radiation detector.
Figure 22:
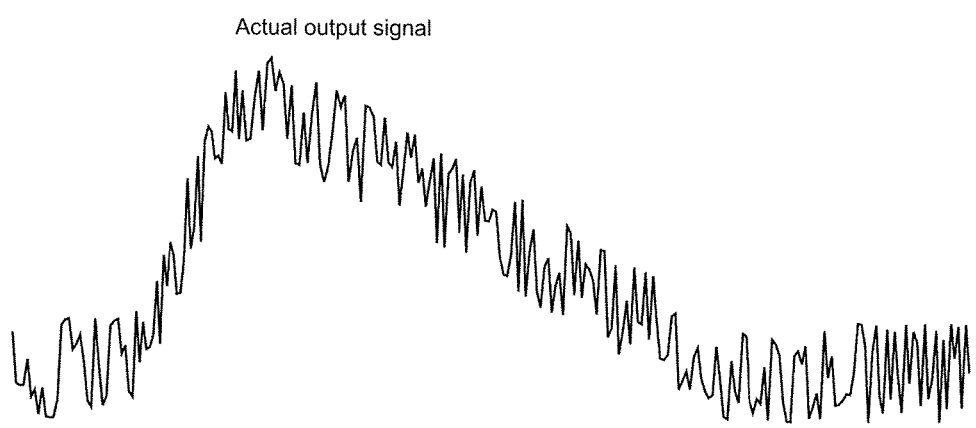
FIG. 22 is a schematic diagram illustrating the conventional radiation detector.

Referring to FIG. 12, the fluorescence emission-time calculation element 11, the fluorescence emission-location calculation element 12 and the fluorescence strength calculation element 13 are illustrated how connected to the amplifiers a1, a2, a3, a4, a5, . . . , a64. The amplifiers a1, a2, a3, a4, a5, . . . , a64 are connected to the addition circuit 10 via the limiter circuit La1, La2, La3, La4, La5, . . . , La64 respectively corresponding thereto and as set forth above, the outputs of the addition circuit 10 are the inputs into the fluorescence emission-time calculation element 11. The outputs of the amplifiers a1, a2, a3, a4, a5, . . . , a64 are directly input into the fluorescence emission-location calculation element 12. The fluorescence emission-location calculation element 12 has no aspect corresponding to the addition circuit 10 and consequently, the noise component of the signal is not superimposed; so that the limiter circuit L is not always needed. The fluorescence emission-location calculation element 12 calculates the location of the fluorescence emission-location based on the amplification signal output from each of the amplifiers a corresponding to each of the detection elements 3a of the photodetector 3.

In addition, the fluorescence strength calculation element 13 calculates the fluorescence strength using the signal which is the sum of the output signals per se of the amplifiers a1, a2, a3, a4, a5, . . . , a64. The addition circuit 9 executes to sum such output signals. The signals including lots of noise components as set forth referring to FIG. 9 are input into the fluorescence strength calculation element 13. The fluorescence strength calculation element 13 functions to integrate the input signals. Therefore, the fluorescence strength can be accurately obtained. According to the integration processing, the point where the fluorescence emits shifts back and forth and more or less. Therefore, the accurate point where the fluorescence emits cannot be obtained when the integration processing is executed. However, such fact is not particularly concerned when the fluorescence strength is obtained. The limiter circuit L is not always needed for the fluorescence strength calculation element 13. The addition circuit 9 sums the amplification signals output from each of the amplifiers a corresponding to each of the detection elements 3a of the photodetector 3 and the fluorescence strength calculation element 13 calculates the fluorescence strength based on the output from the addition circuit 9. The addition circuit 9 corresponds to the amplifier signal addition means of the present invention.

(Other Effects of the Aspect of the Present Invention)

One aspect of the present invention provides an effect on which the fluorescence emission-time can be accurately calculated as set forth above. Another aspect of the present invention provides an effect on suppressing a pile-up of fluorescence other than the above effect and the inventor sets forth such point. The pile-up of the fluorescence is a phenomenon in which the fluorescences is erroneously recognized as if one phenomenon even though such fluorescences emit in association with two different phenomena when fluorescences emit in a row.

It is the case when two γ-rays are incident into the scintillator 2 in a short time-interval. At this time, the scintillator 2 emits the first fluorescence and after a while, emits the fluorescence again. The first fluorescence is originating in the former incident γ-ray into the scintillators 2 and the second fluorescence is originating in the latter incident γ-ray into the scintillators 2. Accordingly, two fluorescences are independent phenomena each other.

Referring to FIGS. 13A, 13B, it is given that the first fluorescence is detected by the detection elements 3a1, 3a2 and the second fluorescence is detected by the detection element (detection element 3a3, 3a4) other than the detection element 3a1, 3a2, which are not involved in the detection of the first fluorescence. In such case, the time-course of the outputs of the amplifiers a1, a2, a3, a4 is illustrated. The amplifier a1, the amplifier a2, corresponding to the detection elements 3a1, 3a2 in conjunction with the detection of the first fluorescence output the signal denoting that the fluorescence is detected. Afterward, no fluorescence is incident into the detection elements 3a1, 3a2, the voltage of the output signal settles down to the first level. Afterward, the amplifier a3, the amplifier a4, corresponding to the detection elements 3a3, 3a4 in conjunction with the detection of the second fluorescence output the signal denoting that the fluorescence is detected. Afterward, no fluorescence is incident into the detection elements 3a3, 3a4, the voltage of the output signal settles down to the first level. In the case referring to FIG. 13, it is given that the output signal of the amplifier a1, the amplifier a2 settles down prior to the time when the voltage of the output signal of the amplifiers a3, a4 increases, but the time when the output signal of the amplifier a1, the amplifier a2 settles down and the time when the voltage of the output signal of the amplifiers a3, a4 increases are fairly close.

When such outputs from the amplifiers a1, a2, a3, a4 are summed by the addition circuit 10, the result should be represented by the FIG. 13B. It is understandable that an interval exists between the peak relative to the first fluorescence and the peak relative to the second fluorescence and the two peaks are subjected to the different phenomena.

Figure 11:
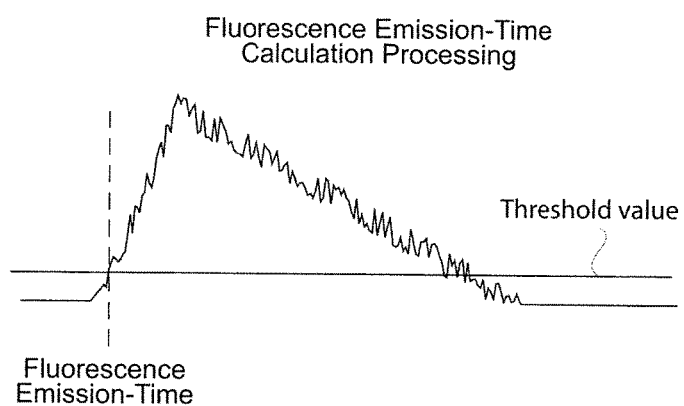
FIG. 11 is a schematic diagram illustrating an operation of a fluorescence emission-time calculation element according to the aspect of the Embodiment 1.

However. in fact, the output from the addition circuit 10 includes lots of noises. In such case, the peak relative to the first fluorescence and the peak relative to the second fluorescence are connected by the noise component. As set forth referring to FIG. 11, the output of the addition circuit 10 lower than the threshold value must be higher than the threshold value to calculate the fluorescence emission-time. However, when the output from the addition circuit 10 includes lots of noises, the borderline between the first peak and the second peak becomes unclear, so that the output from the addition circuit 10 between the peaks may not be lower than the threshold value. In such scenario, the fluorescence emission-time calculation element 11 treats as if just one γ-ray is detected. Therefore, the fluorescence emission-time calculation element 11 does not calculate the fluorescence emission-time relative to the second peak.

Referring to FIG. 14, the inventor sets forth the case in which a limiter circuit L is installed in the upper stream of the addition circuit 10 according to the aspect of the present invention. In such case, the part of the outputs of the amplifiers a1, a2, a3, a4, which is not related to the peak, is flatted by the limiter circuit L prior to summing. Referring to FIG. 14, the flat parts in both sides of the peaks are survived after summing the signals and appear in the output of the addition circuit 10. Such flat part functions to separate clearly the first peak and the second peak. Therefore, according to the aspect of the present invention, the borderline between the first peak and the second peak with regard to the output of the addition circuit 10 is never unclear, so that the fluorescence emission-location calculation element 11 never misses to find the second peak.

As set forth above, the present invention improves a signal processing relative to an output of an amplifier a. Specifically, according to the present invention, the limiter circuit L instead of a low-pass filter and a high-pass filter removes a noise component of the amplifier output. The limiter circuit blocks passing through the amplification signal when the amplification signal output from the amplifier is lower than the limit level. Accordingly, a noise component output not related to the fluorescence detection from the amplifier a is blocked by the limiter circuit L and is unable to reach to the addition circuit. On the other hand, when the amplification signal output from the amplifier is larger than the limit level, the limiter circuit L passes through such amplification signal; so that the signal related to a fluorescence detection, which the amplifier outputs, can be absolutely input into the fluorescence emission-time calculation means. Consequently, according to the present invention, a radiation detector that can calculate further accurately the fluorescence emission-time can be provided.

In addition, referring to FIGS. 2A, 2B, when the array pitch of the scintillator crystals C and the array pitch of the detection elements 3a are different each, a plurality of the detection elements 3a is optically connected to one scintillator crystal C. In such structure, it is given that the fluorescence emitted from the scintillator crystal C is detected by a plurality of the detection elements 3a, so that the application of the present invention is quite significant.

The present invention is not limited to the above constitution and may work in the following alternative manner.

(1) The scintillators 2 according to the aspect of the present Embodiment comprises the scintillator crystals C that are optically connected one another, but the present invention is not limited to such aspect. A reflection board between the scintillator crystals per se, which reflects a fluorescence, can be equipped. Even when such reflection board is equipped, the present invention can provide the effect set forth above as far as a plurality of detection elements detect fluorescences emitted from one scintillator crystal.

(2) The scintillators 2 according to the aspect of the present Embodiment comprises the aspect in which the array pitch of the scintillator crystals C and the array pitch of the detection elements 3a of the photodetector are different each other, but the present invention is not limited to such aspect. Both array pitches can be the same. Even when such aspect, the present invention can provide the effect set forth above as far as a plurality of detection elements detect fluorescences emitted from one scintillator crystal.

INDUSTRIAL APPLICABILITY

As set forth above, the present invention is suitable for medicinal field.

REFERENCE OF SIGNS a Amplifier
C Scintillator crystal
L Limiter circuit
2 Scintillator
3 Photodetector
9 Addition circuit (Amplifier signal addition means)
10 Addition circuit (Limiter circuit signal addition means)
11 Fluorescence emission-time calculation element (Fluorescence emission-time calculation element)
12 Fluorescence emission-location calculation element (Fluorescence emission-location calculation element)
13 Fluorescence strength calculation element (Fluorescence strength calculation element)

Also, the inventors intend that only those claims which use the complete words "means for" are intended to be interpreted under 35 USC 112, sixth paragraph. Moreover, no limitations from the specification are intended to be read into any claims, unless those limitations are expressly included in the claims.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. A radiation detector, comprising:
   a scintillator having arrayed scintillator crystals that convert a radiation to a fluorescence; and
   a photodetector, comprising:
      a plurality of detection elements that detect said fluorescence emitted from said scintillator crystal; and
   further comprising:
      an amplifier that amplifies an element signal output from said detection elements;
      a limiter circuit that holds a limit level that is set up as higher than an amplification signal that varies depending on a noise output from said amplifier when said detection element detects no fluorescence and blocks said amplification signal by outputting a signal corresponding to said limit level when said amplification signal that is output from said amplifier is lower than said limit level, and passes said amplification signal when said amplification signal is larger than said limit level;
      a limiter circuit signal addition means that sums signals output from each said limiter circuit corresponding to each said detection element in said photodetector; and
      a fluorescence emission-time calculation means that calculates an emission-time of said fluorescence based on the output of said limiter circuit signal addition means.

2. The radiation detector, according to claim 1, further comprising:
   a fluorescence emission-location calculation means that calculates an emission-location of said fluorescence based on said amplification signal output from each said amplifier corresponding to each said detection element and that is linked to said photodetector.

3. The radiation detector, according to claim 1, further comprising:
   an amplifier signal addition means that sums amplification signals output from each said amplifier corresponding to each said detection element of said photodetector; and
   a fluorescence strength calculation means that calculates a fluorescence strength based on an output of said amplifier signal addition means.

4. The radiation detector, according to claim 1, wherein:
   an array pitch of said scintillator crystals and an array pitch of said detection elements are different each other.

5. A radiation imaging device, comprising:
   a radiation detector according to claim 1.

* * * * *